(12) United States Patent
Kim et al.

(10) Patent No.: US 9,775,023 B2
(45) Date of Patent: Sep. 26, 2017

(54) UE CAPABILITY REPORT METHOD AND APPARATUS IN MOBILE COMMUNICATION SYSTEM

(71) Applicant: Samsung Electronics Co., Ltd., Suwon-si, Gyeonggi-do (KR)

(72) Inventors: Soeng Hun Kim, Yongin-si (KR); Gert-Jan Van Lieshout, Staines (GB); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/475,918

(22) Filed: Sep. 3, 2014

(65) Prior Publication Data

US 2014/0370905 A1 Dec. 18, 2014

Related U.S. Application Data

(63) Continuation of application No. 13/352,653, filed on Jan. 18, 2012.
(Continued)

(30) Foreign Application Priority Data

Dec. 21, 2011 (KR) .................. 10-2011-0139376

(51) Int. Cl.
*H04W 72/04* (2009.01)
*H04W 8/24* (2009.01)
(Continued)

(52) U.S. Cl.
CPC .......... *H04W 8/24* (2013.01); *H04W 28/048* (2013.01); *H04W 72/0453* (2013.01); *H04W 24/10* (2013.01); *H04W 88/06* (2013.01)

(58) Field of Classification Search
CPC .... H04W 24/10; H04W 28/048; H04W 88/06
(Continued)

(56) References Cited

U.S. PATENT DOCUMENTS

| 8,537,718 B2 * | 9/2013 | Etemad ................. H04L 5/003 370/254 |
| 2009/0170426 A1 | 7/2009 | Jung et al. |

(Continued)

FOREIGN PATENT DOCUMENTS

| CN | 103119996 A | 5/2013 |
| CN | 103141041 A | 6/2013 |

(Continued)

OTHER PUBLICATIONS

Nokia Siemens Networks, et al., "UE capability signalling for CA and MIMO in REL10", 3GPP TSG RAN WG2 Meeting #72, R2-106892, Nov. 15-19, 2010.
(Continued)

*Primary Examiner* — Qun Shen
(74) *Attorney, Agent, or Firm* — Jefferson IP Law, LLP

(57) ABSTRACT

A method and an apparatus for reporting a capability of a User Equipment (UE) supporting advanced functions such as Carrier Aggregation (CA) are provided. The method includes checking, when a control message requesting a capability report is received, a Radio Access Technology (RAT) type and transmitting, when the RAT type is set to Evolved Universal Terrestrial Radio Access (EUTRA), at least one band combination information on at least one band combination supported by the terminal. The UE capability report method is capable of reporting the UE capability related to advanced functions, such as CA and Multiple Input Multiple Output (MIMO), to a network efficiently with the least amount of information, thereby resulting in an improvement of radio resource efficiency.

28 Claims, 11 Drawing Sheets

US 9,775,023 B2

Page 2

Related U.S. Application Data

(60) Provisional application No. 61/433,651, filed on Jan. 18, 2011, provisional application No. 61/442,985, filed on Feb. 15, 2011, provisional application No. 61/471,872, filed on Apr. 5, 2011.

(51) Int. Cl.
*H04W 28/04* (2009.01)
*H04W 24/10* (2009.01)
*H04W 88/06* (2009.01)

(58) Field of Classification Search
USPC .......... 370/329, 341–342, 431; 455/450, 509
See application file for complete search history.

(56) References Cited

U.S. PATENT DOCUMENTS

| | | | |
|---|---|---|---|
| 2010/0103873 A1* | 4/2010 | Buracchini | 370/328 |
| 2010/0130205 A1 | 5/2010 | Jung et al. | |
| 2010/0159919 A1 | 6/2010 | Wu | |
| 2010/0296473 A1 | 11/2010 | Kim et al. | |
| 2011/0105043 A1* | 5/2011 | Wu | H04W 24/10 455/67.11 |
| 2011/0158116 A1 | 6/2011 | Tenny et al. | |
| 2011/0205976 A1* | 8/2011 | Roessel | H04L 5/001 370/329 |
| 2011/0222484 A1* | 9/2011 | Pedersen et al. | 370/329 |
| 2011/0299502 A1* | 12/2011 | Jung | H04W 36/0077 370/331 |
| 2011/0319069 A1* | 12/2011 | Li | H04W 8/22 455/422.1 |
| 2012/0040687 A1* | 2/2012 | Siomina et al. | 455/456.1 |
| 2012/0087317 A1 | 4/2012 | Bostrom et al. | |
| 2012/0099542 A1* | 4/2012 | Yuk | H04L 5/0007 370/329 |
| 2012/0178465 A1* | 7/2012 | Lin | H04W 24/10 455/450 |
| 2012/0213096 A1* | 8/2012 | Krishnamurthy | H04L 5/001 370/252 |
| 2012/0243498 A1* | 9/2012 | Kwon | H04L 5/00 370/329 |
| 2013/0121203 A1 | 5/2013 | Jung et al. | |
| 2013/0188510 A1 | 7/2013 | Siomina et al. | |
| 2013/0215849 A1* | 8/2013 | Heo | H04W 52/365 370/329 |
| 2015/0229449 A1 | 8/2015 | Chun et al. | |

FOREIGN PATENT DOCUMENTS

| | | |
|---|---|---|
| JP | 2011-508559 A | 3/2011 |
| JP | 2012-531121 A | 12/2012 |
| WO | 2009-096745 A2 | 8/2009 |
| WO | 2010065759 A2 | 6/2010 |
| WO | 2010-148404 A1 | 12/2010 |
| WO | 2011002789 A1 | 1/2011 |

OTHER PUBLICATIONS

Nokia Corporation, et al., "Correction to UE system specific capability for EUTRA", 3GPP TSG RAN WG2 Meeting #72, R2-106483, Nov. 15-19, 2010.

Research in Motion Limited, "Addition of UEEUTRA—Capability description", 3GPP TSG RAN WG2 Meeting #72, R2-106137, Nov. 15-19, 2010.

NTT DOCOMO, Further discussions on LTE-A UE categories/capabilities, 3GPP TSG-RAN WG4 Ad-hoc meeting #2010-04 R4-103470, Oct. 11-15, 2010.

3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331 v10.0.0 (Dec. 2010), pp. 90-91, 219-224.

Ericsson et al., Measurement gap capability signalling for CA, 3GPP TSG-RAN WG2 #72bis Tdoc R2-110325, Jan. 17-21, 2011, pp. 1-3.

Alcatel-Lucent et al., Measurement gaps handling, TSG-RAN WG2#72bis R2-110295, Jan. 17-21, 2011, pp. 1-3.

VODAFONE: Updated TP for UE Capability Handling in TS 36.331, 3GPP Draft; R2-085952, 3rd Generation Partnership Project (3GPP), Mobile Competence Centre ; 650, Route Des Lucioles ; F-06921 Sophia-Anti Polis Cedex ;France, no. Prague, Czech Republic; Oct. 8, 2008, Oct. 8, 2008 (Oct. 8, 2008), XP050320663, [retrieved on Oct. 8, 2008].

NTT DOCOMO: Further discussions on LTE-A LIE categories/capabilities, 3GPP Draft; R4-103847, 3rd Generation Partnership Project (3GPP), Mobile Competence Centre ; 650, Route Des Lucioles ; F-06921 Sophia-Anti Polis Cedex ; France, vol. RAN WG4, no. Xian; Oct. 11, 2010, Oct. 9, 2010 (Oct. 9, 2010) XP050455497, [retrieved on Oct. 9, 2010].

Ericsson, ST-Ericsson, UE capability signalling for CA and UL/DL MIMO, 3GPP TSG-RAN WG2 #72bis Tdoc R2-110318, Dublin, Ireland; Jan. 21, 2011.

Samsung, UE capability signaling structure w.r.t carrier aggregation, MIMO and measurement gap, 3GPP TSG-RAN2#73 meeting Tdoc R2-110874, Taipei, Taiwan; Feb. 25, 2011, pp. 1-5.

Samsung: Clarification on BandCombinationParameters, 3GPP Draft' 36331_CR0641R1_(Rel-10)_R2-111625, 3rd Generation Partnership Project (3GPP), Mobile Competence Centre ; 650, Route Des Luci0les ; F-06921 Sophia-Antipolis Cedex ; France, vol. RAN WG2, no. Taipei, Taiwan; Feb. 21, 2011, Feb. 25, 2011 (Feb. 25, 2011), XP050494024, [retrieved on Feb. 25, 2011].

E-Mail Rapporteur (NTT DOMOCO, Inc.); CA support for multi-TA; 3GPP TSG-RAN2#69; R2-101567; Feb. 22-26, 2010; San Francisco, CA.

Nokia Siemens Networks et al.; TDM eICIC Patterns for Rel-10 UE measurement restrictions; 3GPP TSG RAN WG4#57 Meeting; R4-104309; Nov. 15-19, 2010; Jacksonville, FL.

LG Electronics Inc.; Measurement restriction for macro-pico scenario; 3GPP TSG-RAN2 Meeting #72; R2-106579; Nov. 15-19, 2010; Jacksonville, FL.

3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321; V10.0.0; Dec. 2010; France.

3GPP; 3rd Generation Partnership Project; Technical Specification Group Radio Access Network; Evolved Universal Terrestrial Radio Access (E-UTRA); Medium Access Control (MAC) protocol specification (Release 10); 3GPP T 36.321; V10.0.0; Dec. 17, 2010; France.

CMCC; Measurement resource restriction patterns for inter-frequency measurement in eICIC; 3GPP TSG-RAN WG2 Meeting #72bis; R2-110394; Jan. 17-21, 2011; Dublin, Ireland.

Ericsson et al.; Adding a Power Management indication in PHR; 3GPP TSG-RAN2 Meeting #73; R2-110940; Feb. 21-25, 2011; Taipei, Taiwan.

3GPP TS 36.321 V10.1.0 , "Medium Access Control (MAC) protocol specification (Release 10)," Mar. 2011.

E-Mail Rapporteur (NTT DOMOCO, Inc.); CA support for multi-TA; 3GPP TSG-RAN2#69; R2-101567; dated Feb. 22-26, 2010; San Francisco, CA.

Nokia Siemens Networks et al.; TDM eICIC Patterns for Rel-10 UE measurement restrictions; 3GPP TSG RAN WG4#57 Meeting; R4-104309; dated Nov. 15-19, 2010; Jacksonville, FL.

LG Electronics Inc.; Measurement restriction for macro-pico scenario; 3GPP TSG-RAN2 Meeting #72; R2-106579; dated Nov. 15-19, 2010; Jacksonville, FL.

3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321; V10.0.0; dated Dec. 2010; France.

(56) References Cited

OTHER PUBLICATIONS

3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321; V10.0.0; dated Dec. 17, 2010; France.

CMCC; Measurement resource restriction patterns for inter-frequency measurement in eICIC; 3GPP TSG-RAN WG2 Meeting #72bis; R2-110394; dated Jan. 17-21, 2011; Dublin, Ireland.

Ericsson et al.; Adding a Power Management indication in PHR; 3GPP TSG-RAN2 Meeting #73; R2-110940; dated Feb. 21-25, 2011; Taipei, Taiwan.

3GPP TS 36.321 V10.1.0 , "Medium Access Control (MAC) protocol specification (Release 10)," dated Mar. 2011.

Ericsson et al: "Timing Advance Maintenance for SCells", 3GPP Draft; R2-121558, XP050606352; Jeju, South Korea; dated Mar. 20, 2012.

InterDigital, "PHR Triggering for SAR" [online], 3GPP TSG-RAN WG2#72bis R2-110220, Dublin, Ireland, dated Jan. 11, 2011.

Ericsson, ST-Ericsson, Qualcomm Incorporated, Nokia Siemens Networks, "Power Management indication in PHR" [online], 3GPP TSG-RAN WG2#73 R2-110941, Taipei, Taiwan, dated Feb. 14, 2011.

Qualcomm Incorporated, "PHR Trigger for Power Reduction Due to Power Management" [online], 3GPP TSG-RAN WG2#73 R2-110797, Taipei, Taiwan, dated Feb. 14, 2011.

\* cited by examiner

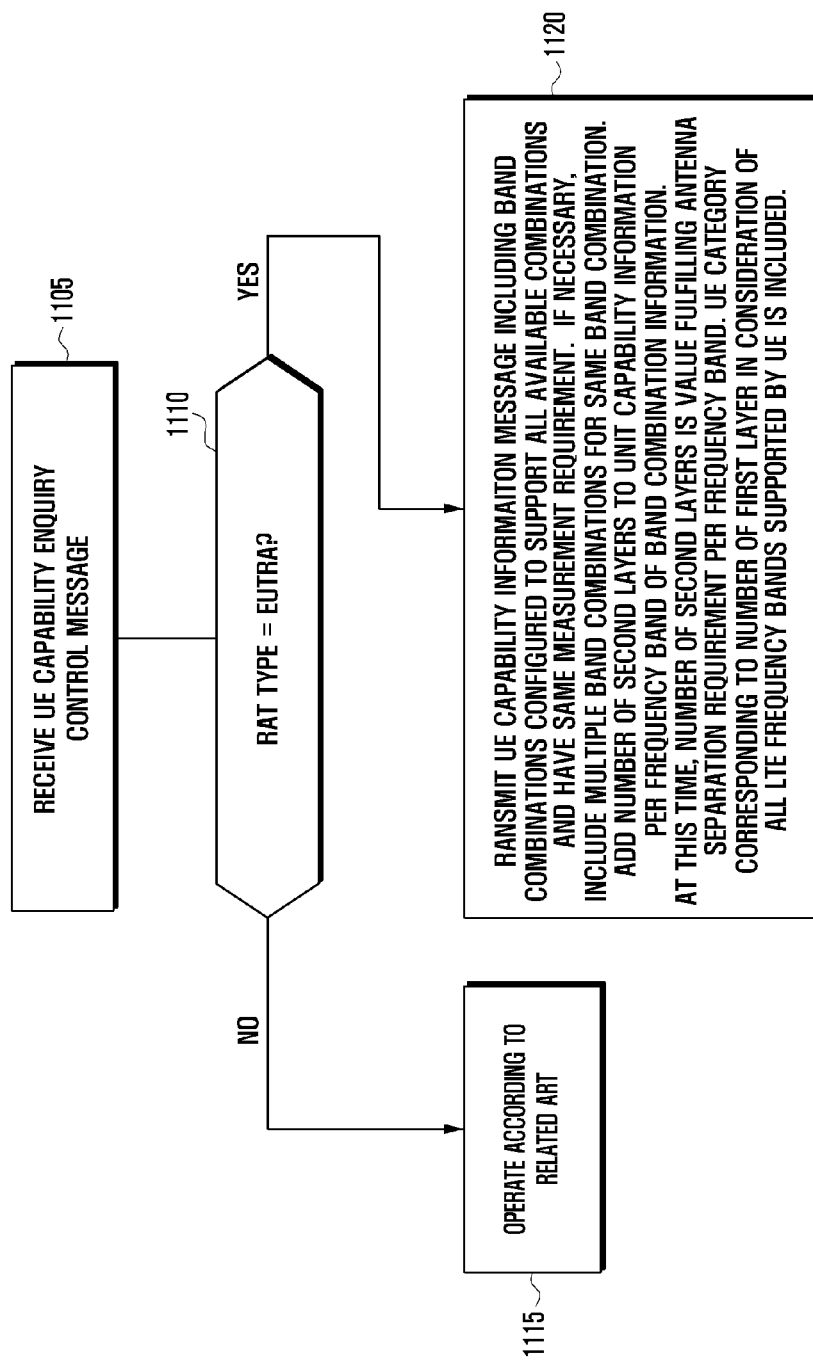

UE CAPABILITY REPORT METHOD AND APPARATUS IN MOBILE COMMUNICATION SYSTEM

CROSS-REFERENCE TO RELATED APPLICATIONS

This application is a continuation application of a prior application Ser. No. 13/352,653, filed on Jan. 18, 2012, which claimed the benefit under 35 U.S.C. §119(e) of a U.S. provisional application filed on Jan. 18, 2011 in the U.S. Patent and Trademark Office and assigned Ser. No. 61/433,651, of a U.S. Provisional application filed on Feb. 15, 2011 in the U.S. Patent and Trademark Office and assigned Ser. No. 61/442,985, and of a U.S. Provisional application filed on Apr. 5, 2011 in the U.S. Patent and Trademark Office and assigned Ser. No. 61/471,872, and under 35 U.S.C. §119(a) of a Korean patent application filed on Dec. 21, 2011 in the Korean Intellectual Property Office and assigned Serial number 10-2011-0139376, the entire disclosure of each of which is hereby incorporated by reference.

BACKGROUND OF THE INVENTION

1. Field of the Invention

The present invention relates to a User Equipment (UE) capability report method and apparatus. More particularly, the present invention relates to a method and apparatus for reporting the capability of a UE supporting advanced functions such as Carrier Aggregation (CA).

2. Description of the Related Art

Mobile communication systems were originally developed to provide subscribers with voice communication services on the move. With the rapid advancement of various technologies, the mobile communication systems have evolved to support high speed data communication services as well as the voice communication services.

Recently, a next generation mobile communication system of the 3rd Generation Partnership Project (3GPP), referred to as a Long Term Evolution (LTE) system, is under development. The LTE system is a technology for realizing high-speed packet-based communication at about 100 Mbps. Recently, an LTE-Advanced (LTE-A) system is actively discussed as an evolution of the LTE system. The LTE-A system employs new techniques to increase the data rate. Hereinafter, both the legacy LTE system and LTE-A system are referred to as the LTE system.

The LTE system employs carrier aggregation as one of the significant technologies to meet broader bandwidth requirements. The carrier aggregation is a technology for a User Equipment (UE) to transmit/receive data over multiple carriers. More specifically, the UE transmits/receives data in cells using carriers that are aggregated (for cells under the control of the same evolved Node B (eNB)). This means that the UE transmits/receives data in multiple cells.

The adoption of new technologies brings about a need to modify a capability report format so as to be capable of simultaneously accommodating information on newly introduced technologies such as carrier aggregation as well as legacy technology such as Multiple Input Multiple Output (MIMO).

SUMMARY OF THE INVENTION

Aspects of the invention are to address at least the above-mentioned problems and/or disadvantages and to provide at least the advantages described below. Accordingly, an aspect of the present invention is to provide a User Equipment (UE) capability report method and apparatus that is capable of efficiently reporting a capability of the UE supporting advanced transmission technologies such as carrier aggregation.

In accordance with an aspect of the present invention, a method for reporting terminal capability is provided. The method includes checking, when a control message requesting a capability report is received, a Radio Access Technology (RAT) type and transmitting, when the RAT type is set to Evolved Universal Terrestrial Radio Access (EUTRA), at least one band combination information on at least one band combination supported by the terminal.

Preferably, transmitting of the at least one band combination information includes combining at least one unit capability having a same measurement gap requirement into the at least one band combination information.

In accordance with another aspect of the present invention, an apparatus for reporting terminal capability is provided. The apparatus includes a transceiver which receives a control message requesting a capability report and a controller which controls, when a RAT type included in the control message is set to EUTRA, to transmit at least one band combination information on at least one band combination supported by the terminal.

Preferably, the controller combines at least one unit capability having a same measurement gap requirement into the at least one band combination information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 11 is a flowchart illustrating operating procedure of the UE according to another exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and an apparatus for a User Equipment (UE) to report its capability to the network. Prior to the explanation o the exemplary embodiments of the present invention, a description is made of Long Term Evolution (LTE) and Carrier Aggregation (CA).

Figure 1:
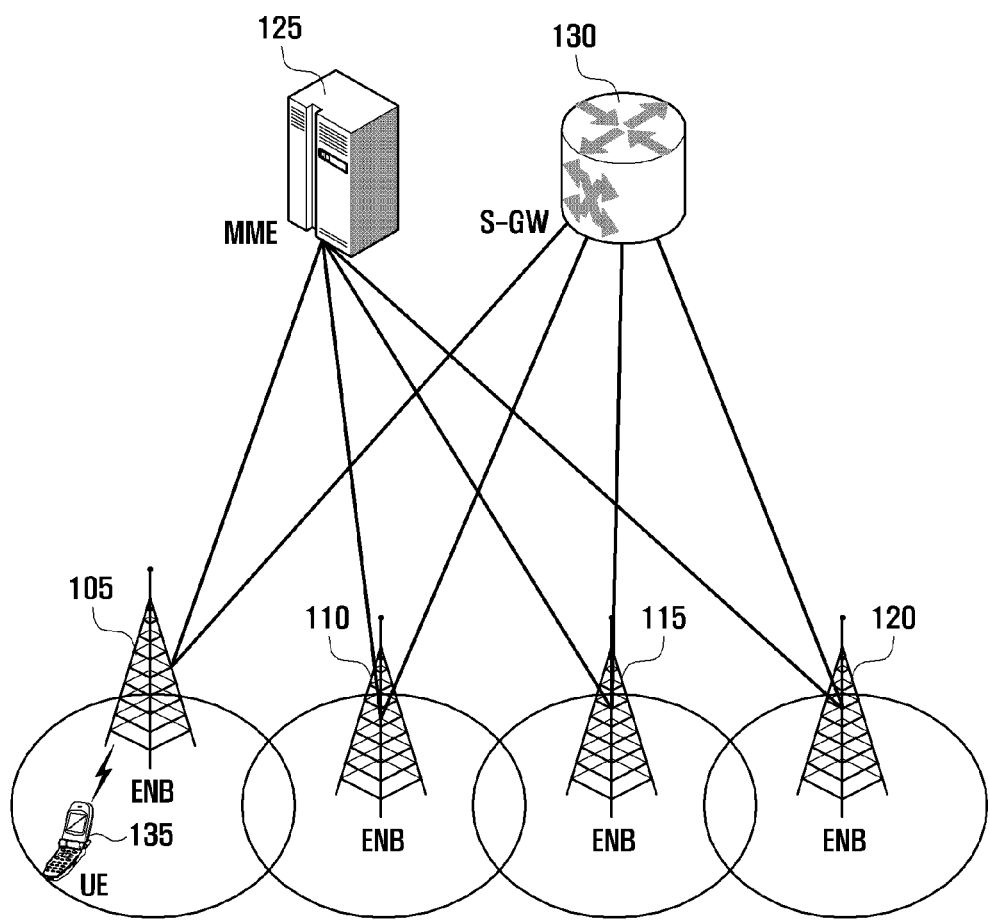
FIG. 1 is a diagram illustrating an architecture of a Long Term Evolution (LTE) system according to an exemplary embodiment of the present invention.

FIG. 1 is a diagram illustrating an architecture of an LTE system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The UE 135 connects to an external network via eNBs 105, 110, 115, and 120 and the S-GW 130.

In FIG. 1, the eNBs 105, 110, 115, and 120 correspond to legacy node Bs of a Universal Mobile Communications System (UMTS). The eNBs 105, 110, 115, and 120 allow the UE 135 to establish a radio link and are responsible for complicated functions as compared to the legacy node B.

In the LTE system, all the user traffic including real time services such as Voice over Internet Protocol (VoIP) are provided through a shared channel and thus there is a need for a device which is located in the eNB to schedule data based on the state information such as at least one of UE buffer conditions, power headroom state, channel state, etc. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE.

The S-GW 130 is an entity that provides data bearers so as to establish and release data bearers under the control of the MME 125. The MME 125 is responsible for various control functions and is connected to the eNBs 105, 110, 115, and 120.

Figure 2:
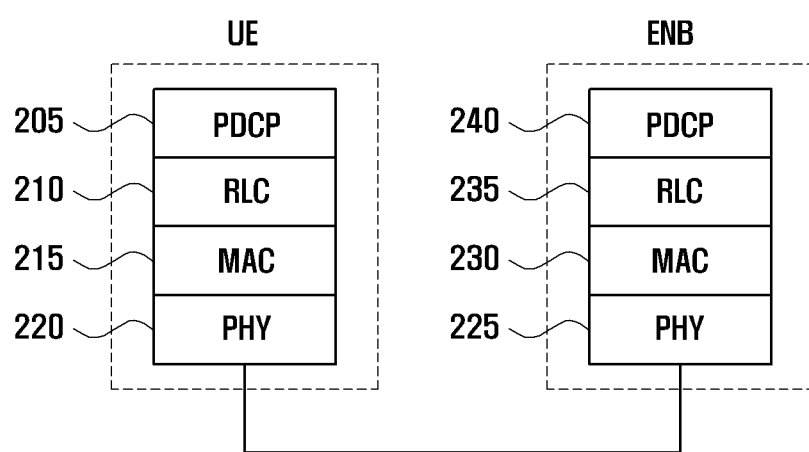
FIG. 2 is a diagram illustrating a protocol stack of an LTE system according to an exemplary embodiment of the present invention.

FIG. 2 is a diagram illustrating a protocol stack of an LTE system according to an exemplary embodiment of the present invention.

Referring to FIG. 2, the protocol stack of the LTE system for use by a UE and an eNB includes a Packet Data Convergence Protocol (PDCP) layer 205 and 240, a Radio Link Control (RLC) layer 210 and 235, a Medium Access Control (MAC) layer 215 and 230, and a Physical (PHY) layer 220 and 225. The PDCP layer 205 and 240 is responsible for Internet Protocol (IP) header compression/decompression. The RLC layer 210 and 235 is responsible for segmenting the PDCP Protocol Data Unit (PDU) into segments of an appropriate size for an Automatic Repeat Request (ARQ) operation. The MAC layer 215 and 230 is responsible for establishing connection to a plurality of RLC entities so as to multiplex RLC PDUs into MAC PDUs and demultiplex the MAC PDUs into RLC PDUs. The PHY layer 220 and 225 performs channel coding on the MAC PDU and modulates the MAC PDU into OFDM symbols to transmit over a radio channel or performs demodulating and channel-decoding on received OFDM symbols and delivers the decoded data to a higher layer.

Figure 3:
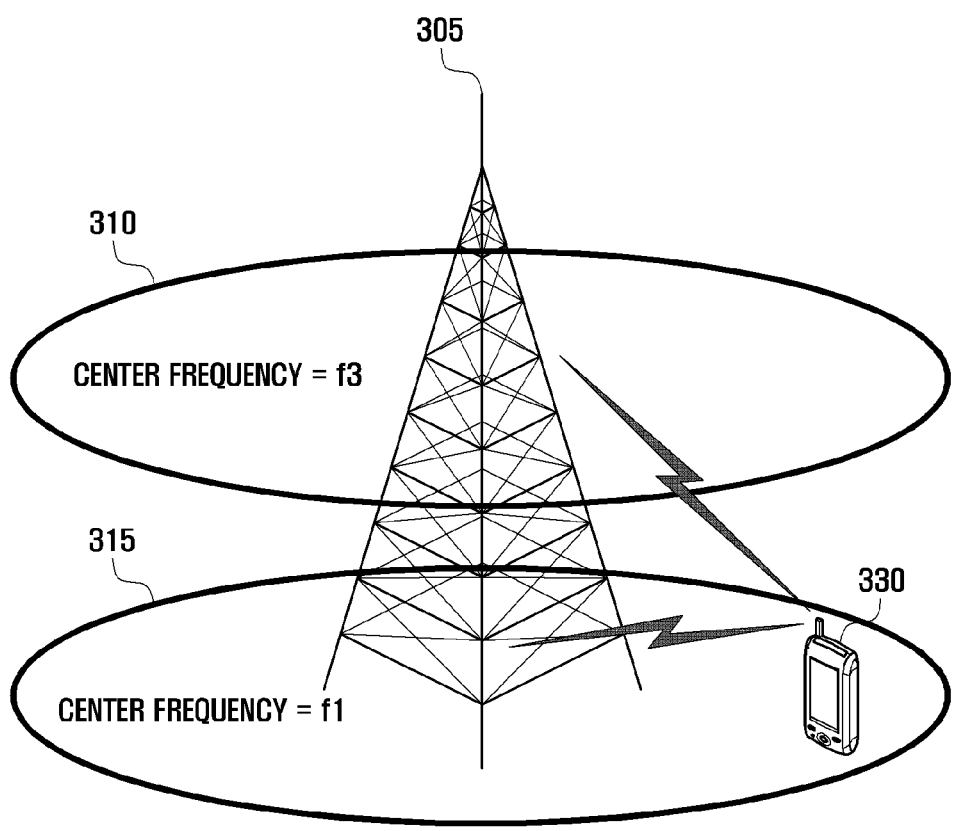
FIG. 3 is a diagram illustrating carrier aggregation in an LTE system according to an exemplary embodiment of the present invention.

FIG. 3 is a diagram illustrating carrier aggregation in an LTE system according to an exemplary embodiment of the present invention.

Referring to FIG. 3, typically an eNB can use multiple carriers transmitted and received in different frequency bands. For example, the eNB 305 can be configured to use the carrier 315 with center frequency f1 and the carrier 310 with center frequency f3. If carrier aggregation is not supported, the UE 330 transmits/receives data using one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE.

In a case where a cell is configured with one downlink carrier and one uplink carrier as a concept of the related art, the carrier aggregation can be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Although the description herein is directed to an LTE mobile communication system for explanation convenience, the present invention can be applied to other types of wireless communication systems supporting carrier aggregation.

In order for a UE to operate normally in a given communication network, the UE notifies the network of its capability. The capability information can include functions (e.g., features) and frequency bands supported by the UE. With the adoption of advanced functions such as carrier aggregation, the complexity and size of UE capability information increases.

The capability-related information reported by the UE to the network may include one or more of:
Frequency band(s) supported by the UE;
Frequency band combination(s) supported by the UE;
Number of Multiple Input Multiple Output (MIMO) layers per frequency band;
Number of cells that can be aggregated per frequency band; and
Maximum bandwidth per frequency band.

The UE capability information items can be combined to express specific capabilities and a certain UE may report capabilities as one or more of:
Aggregation of two cells using frequency band 1 having bandwidth of up to 20 MHz with 4 layers;
Aggregation of one cell using frequency band 1 having bandwidth of up to 10 MHz with 8 layers;
Aggregation of one cell using frequency band 2 having bandwidth of up to 10 MHz with 4 layers; and
Aggregation of one cell using frequency band 1 having bandwidth of up to 10 MHz with 4 layers and aggregation of one cell using frequency band 2 having bandwidth of up to 10 MHz with 2 layers at the same time.

The simplest way to report the UE capability to the network is to transmit individual capability information items one by one explicitly. However, if all of the capability information items are transmitted individually, despite the tendency of the amount of UE capability information to be increased due to the introduction of new capability factors such as carrier aggregation, this is likely to cause a significant traffic overhead problem.

Figure 4:
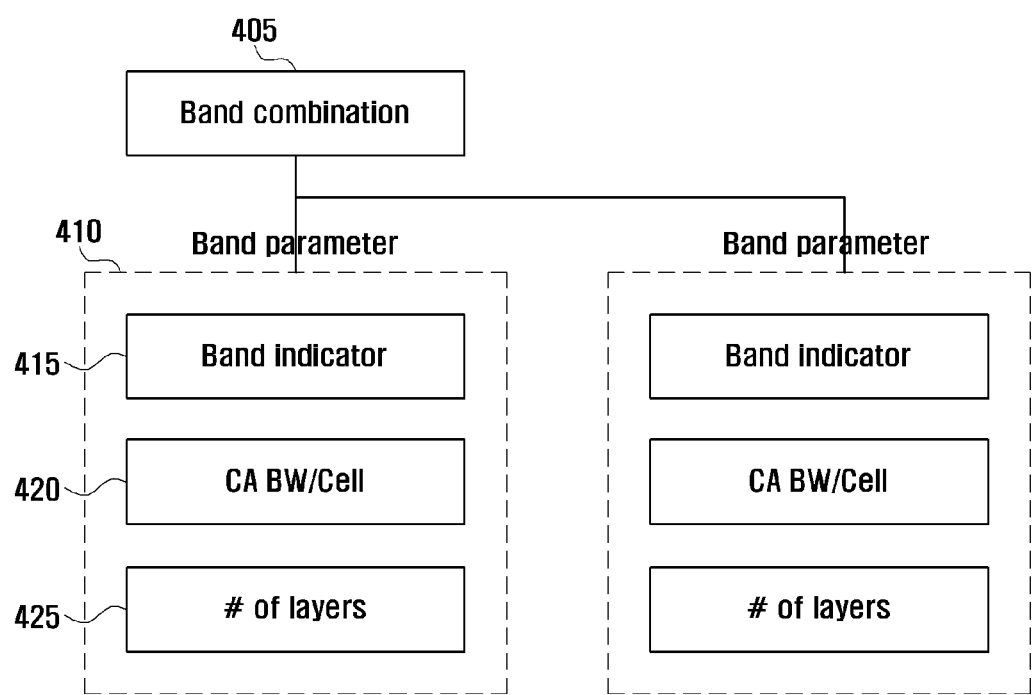
FIG. 4 is a diagram illustrating a configuration of User Equipment (UE) capability information for use in a UE capability report method according to an exemplary embodiment of the present invention.

FIG. 4 is a diagram illustrating a configuration of UE capability information for use in a UE capability report method according to an exemplary embodiment of the present invention. In order to report UE capability, the UE capability information according to an exemplary embodiment of the present invention is configured as follows.

The UE configures the supportable band combination(s) as an information element, which can include as many capability combinations as possible. In detail, the band combination supported by the UE is configured in a hierarchical manner format of information items as shown in FIG. 4.

The band combination information 405 includes a plurality of band parameters 410. The band parameter 410 includes a band indicator 415, a CA BandWidth (BW)/Cell index 420, and a number of layers 425. The band indicator 415 is the index indicating a band and is defined in 3rd Generation Partnership Project (3GPP) Technical Standard (TS) 36.101. The CA BW/Cell index 420 is the parameter indicating a combination of a number of cells supported in a corresponding band combination and the bandwidth of the corresponding band combination.

For example, the CA BW/Cell index n indicates that the UE supports up to m cells and an x MHz bandwidth on the corresponding frequency band. The bandwidth and number of cells are defined as one parameter instead of being defined separately so as to reduce overhead. The CA BW/Cell index 420 can be defined with fixed values in the standard technical specification. For convenience in explanation, CA BW/Cell indices may be defined as one or more of:
CA BW/Cell index 0: support 1 cell with bandwidth of up to 10 MHz;
CA BW/Cell index 1: support 1 cell with bandwidth of up to 20 MHz;
CA BW/Cell index 2: support 2 cells with bandwidth of up to 20 MHz; and
CA BW/Cell index 3: support 3 cells with bandwidth of up to 40 MHz.

The number of layers 425 is the information on the maximum number of layers with which the UE can operate on the corresponding band combination.

For convenience in explanation, the combination of CA BW/index 420 and number of layers 425 is referred to as unit capability. It is typical that a combination of bands (e.g., bands x and y) supports more than one unit capability combination, e.g., one or more of:
1. [band x; CA BW/Cell index=0; number of layers=4] & [band y; CA BW/Cell index=0; number of layers=4];
2. [band x; CA BW/Cell index=1; number of layers=4] & [band y; CA BW/Cell index=0; number of layers=4];
3. [band x; CA BW/Cell index=0; number of layers=4] & [band y; CA BW/Cell index=1; number of layers=4];
4. [band x; CA BW/Cell index=1; number of layers=4] & [band y; CA BW/Cell index=1; number of layers=4]; and
5. [band x; CA BW/Cell index=2; number of layers=2] & [band y; CA BW/Cell index=0; number of layers=4].

If the unit capabilities are transmitted separately in the form of individual band combination information elements, this may cause a UE capability information overhead problem. In order to reduce the overhead, it can be considered to include a plurality of unit capabilities in a band parameter indicating all the combinations among the unit capabilities supported by the UE. In this case, the UE can inform of the combinations 1 to 5 in a band combination information instead of reporting the combinations 1 to 5 in separate band combination information. That is, the UE reports only two band combination information, e.g., on the combination of bands x and y:
[band x; (CA BW/Cell index=0, number of layers=4), (CA BW/Cell index=1, number of layers=4)] & [band y; (CA BW/Cell index=0, number of layers=4), (CA BW/Cell index=1, number of layers=4)]; and
[band x; (CA BW/Cell index=2, number of layers=2)] & [band y; (CA BW/Cell index=0, number of layers=4)].

Figure 5:
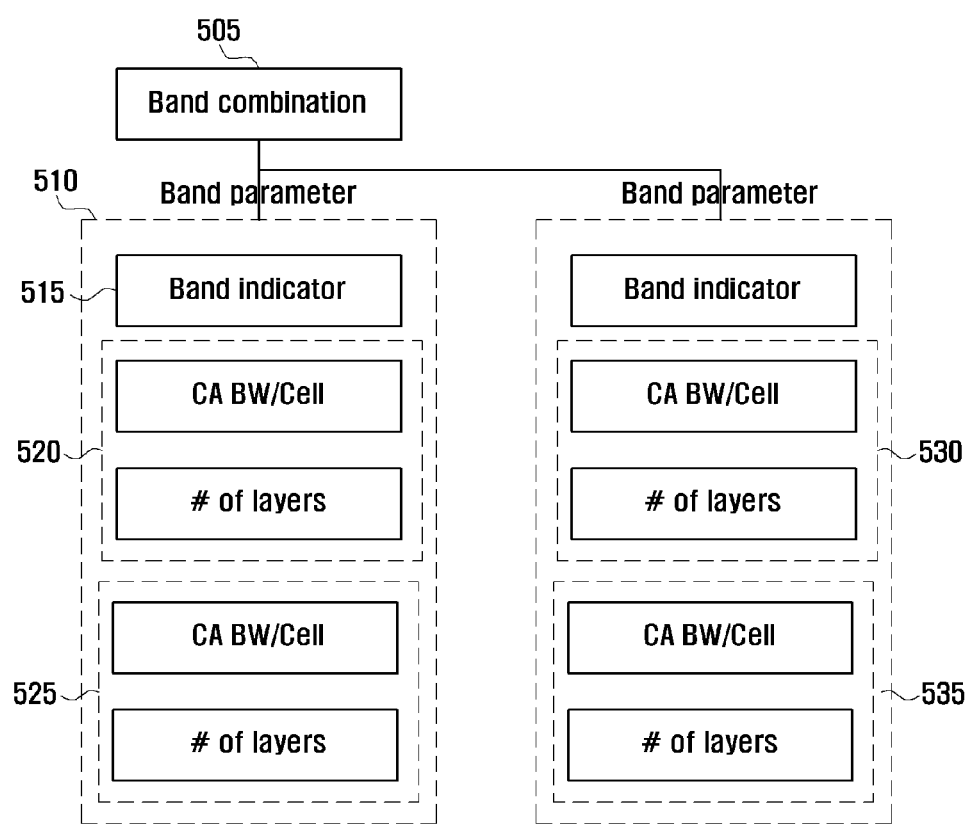
FIG. 5 is a diagram illustrating a configuration of UE capability information for use in a UE capability report method according to another exemplary embodiment of the present invention.

FIG. 5 is a diagram illustrating a configuration of UE capability information for use in a UE capability report method according to another exemplary embodiment of the present invention.

Referring to FIG. 5, the UE capability information can be configured to include band combination information 505 that includes a plurality of band parameters 510. A band parameter 510 includes a band indicator 515 and a plurality of unit capabilities 520 and 525.

If the band parameter 510 includes a plurality of unit capabilities, the UE configures the band parameter 510 such that all of the unit capabilities included in a band parameter of the same band combination and all of the unit capabilities 530 and 535 included in other band parameters can be combined among each other. In other words, the UE determines a number of unit capabilities and the unit capabilities to be included in consideration of the supportable unit capability combinations.

If the combination of unit capabilities 520 and 530, the combination of unit capabilities 520 and 535, the combination of unit capabilities 525 and 530, and the combination of unit capabilities 525 and 535 are supported, the UE packages the unit capabilities 520 and 530 in the band parameter 510 and the unit capabilities 530 and 535 in another band parameter.

Figure 6:
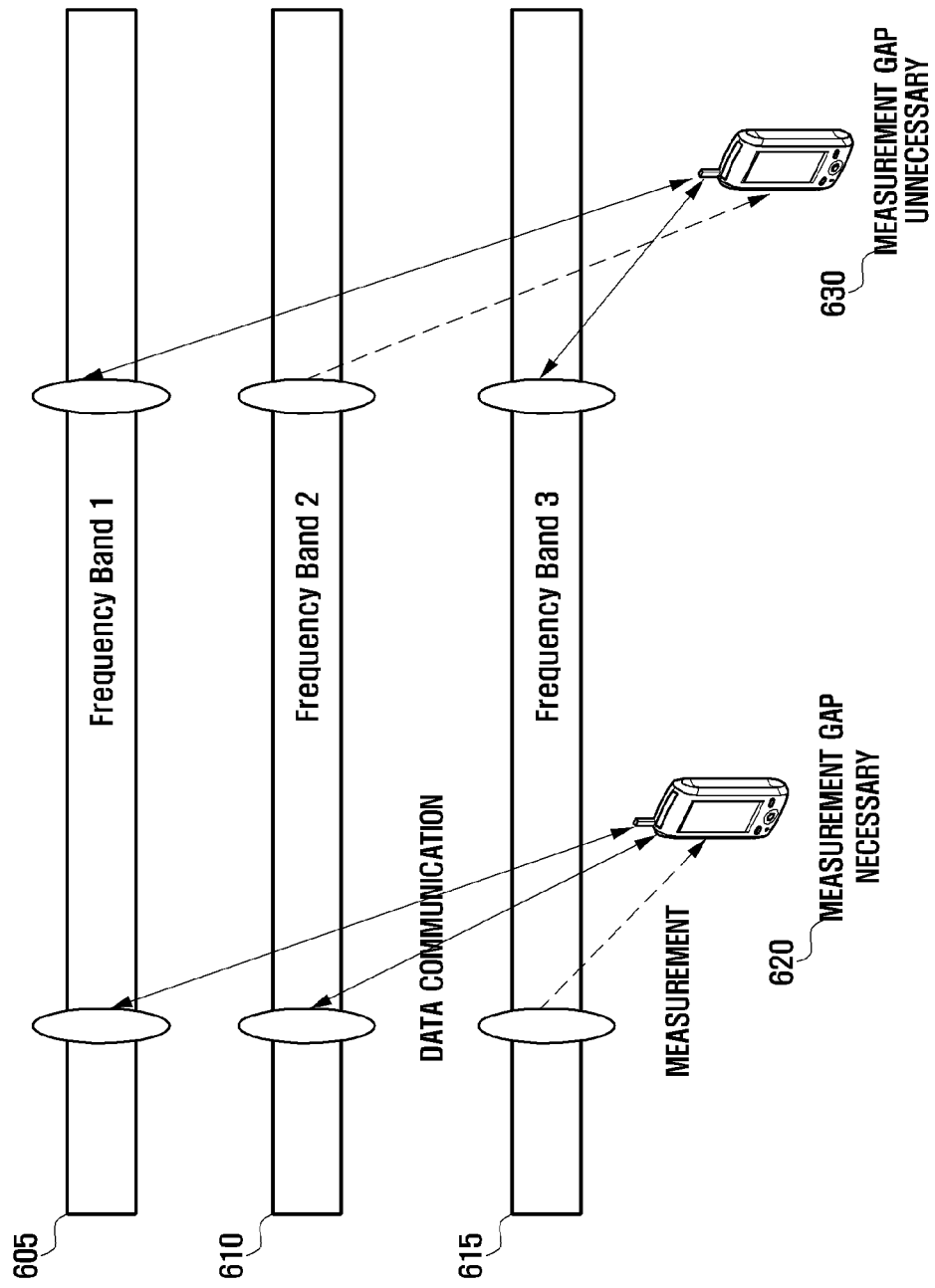
FIG. 6 is a diagram illustrating a measurement gap according to an exemplary embodiment of the present invention.

FIG. 6 is a diagram illustrating a measurement gap according to an exemplary embodiment of the present invention.

Referring to FIG. 6, a UE operating on a frequency performs measurement on other frequency carriers. At this time, the UE switches a Radio Frequency (RF) device (e.g., RF frontend) from the currently running frequency to a target frequency for measurement. In this case, the eNB assigns to the UE a time interval referred to as measurement gap in which no data transmission/reception is allowed. The UE measures other frequency carriers at the assigned measurement gap.

In order to achieve this, the eNB should know when the measurement gap should occur, i.e., the eNB should have the information on the need for the measurement gap. The need for the measurement gap on a certain frequency band is associated with the information on frequency band(s) and the number of cells and number of layers used in the frequency band(s).

For example, the UE supporting a carrier aggregation function is typically provided with a plurality of RF devices. Accordingly, if the UE performs data communication on one frequency band, it is possible for another RF device to perform the measurement, and thus a measurement gap is unnecessary. Otherwise, if two frequency bands are used for data communication, and thus there is no idle RF device, a measurement gap is necessary.

Suppose that the UE uses a predetermined configuration on the frequency band 1 605 and frequency band 2 610 (e.g., one serving with two layers for the frequency band 1 605 and one serving with four layers for the frequency band 2 610). If the UE cannot perform measurement on the frequency band 3 615 while transmitting or receiving data, a measurement gap should be assigned for measurement on the frequency band 3 615. The need for the measurement gap of the frequency band 3 615 is set to 'measurement gap necessary' as denoted by reference number 620.

If the UE can perform measurement on the frequency band 2 610 in the middle of data communication on the frequency band 1 605 and frequency band 3 615 according to a predetermined configuration, the measurement gap requirement for the frequency band 2 610 in the corresponding configuration is set to 'measurement gap unnecessary' as denoted by reference number 630. In consideration of the configuration, it is rational to list the measurement gap requirements for the frequency bands supported by the UE per band combination per unit capability combination. In order to prevent a set of measurement gap requirements for a predetermined unit capability combination of a predetermined band combination from indicating a certain capability combination of a certain band combination separately, the measurement gap requirements are inserted in the same order the band combination information factors are inserted.

For example, the information factors are included in a predetermined control message in order of band combination information 1, band combination information 2, and band combination information 3; the measurement gap requirements are included in order of measurement gap requirement set for band combination information 1, measurement gap requirement set for band combination information 2, and measurement gap requirement set for band combination information 3 in the control message.

By defining the control information structure in such manner, it is possible to reduce signaling overhead. That is, in the present exemplary embodiment the measurement gap is defined per band combination information and the unit capability combinations supported in the band combination information have the same measurement gap requirement. This can be explained as follows. Consider a certain UE that supports 9 unit capability combinations with the measurement gap requirements as shown in Table 1.

TABLE 1

| Unit capability combination [band indicator, (CA BW/Cell index, number Index of layers), . . . ] | measurement gap requirement |
| --- | --- |
| 1  [x,(0, 4)] | band x measurement:measurement gap = unnecessary band y measurement:measurement gap = unnecessary |
| 2  [x,(1, 4)] | band x measurement:measurement gap = unnecessary band y measurement:measurement gap = unnecessary |
| 3  [x,(2, 4)] | band x measurement:measurement gap = unnecessary band y measurement:measurement gap = unnecessary |
| 4  [y,(0, 4)] | band x measurement:measurement gap = unnecessary band y measurement:measurement gap = unnecessary |
| 5  [y,(1, 4)] | band x measurement:measurement gap = unnecessary band y measurement:measurement gap = unnecessary |
| 6  [x,(0, 4)] + [y,(0, 4)] | band x measurement:measurement gap = unnecessary band y measurement:measurement gap = unnecessary |
| 7  [x,(1, 4)] + [y,(0, 4)] | band x measurement:measurement gap = unnecessary band y measurement:measurement gap = unnecessary |
| 8  [x,(0, 4)] + [y,(1, 4)] | band x measurement:measurement gap = unnecessary band y measurement:measurement gap = unnecessary |
| 9  [x,(1, 4)] + [y,(1, 4)] | band x measurement:measurement gap = necessary band y measurement:measurement gap = necessary |

The unit capability combinations 1, 2, and 3 are associated with the same frequency band and share the same measurement gap requirement so as to be expressed by a band combination information as shown in Table 2. Table 2 shows the band combination information on unit capability combinations 1, 2, and 3.

TABLE 2

| band parameter |
| --- |
| band indicator = x |
| CA BW/Cell index = 0, number of layers = 4 |
| CA BW/Cell index = 1, number of layers = 4 |
| CA BW/Cell index = 2, number of layers = 4 |

The unit capability combinations 4, 5 are associated with the same frequency band and share the same measurement gap requirement so as to be expressed by a band combination information as shown in Table 3. Table 3 shows the band combination information on unit capability combinations 4, 5.

TABLE 3 band parameter
band indicator = y
CA BW/Cell index = 0, number of layers = 4
CA BW/Cell index = 1, number of layers = 4

By taking notice of fact that the unit capability combinations 6, 7, 8, and 9 are associated with the same frequency band and have different measurement gap requirements, they cannot be packaged in the same band combination information. Meanwhile, the unit capability combinations 6 and 7 that have the same measurement gap requirement and can be expressed with combinations between unit capabilities can be packaged in the same band combination information. This is shown in Table 3, which shows the band combination information on unit capability combinations 6 and 7.

TABLE 4

| band parameter | band parameter |
|---|---|
| band indicator = x<br>CA BW/Cell index = 0, number of layers = 4<br>CA BW/Cell index = 1, number of layers = 4 | band indicator = y<br>CA BW/Cell index = 0, number of layers = 4 |

Since the unit capability combinations 8 and 9 have different measurement gaps despite being included in the same band combination information in view of the combination between unit capabilities, they are signaled as separate band combination information. This is shown in Tables 5 and 6. Table 5 shows the band combination for unit capability combination 8.

TABLE 5

| band parameter | band parameter |
|---|---|
| band indicator = x<br>CA BW/Cell index = 0, number of layers = 4 | band indicator = y<br>CA BW/Cell index = 1, number of layers = 4 |

Table 6 shows the band combination for unit capability combination 9.

TABLE 6

| band parameter | band parameter |
|---|---|
| band indicator = x<br>CA BW/Cell index = 1, number of layers = 4 | band indicator = y<br>CA BW/Cell index = 1, number of layers = 4 |

Figure 7:
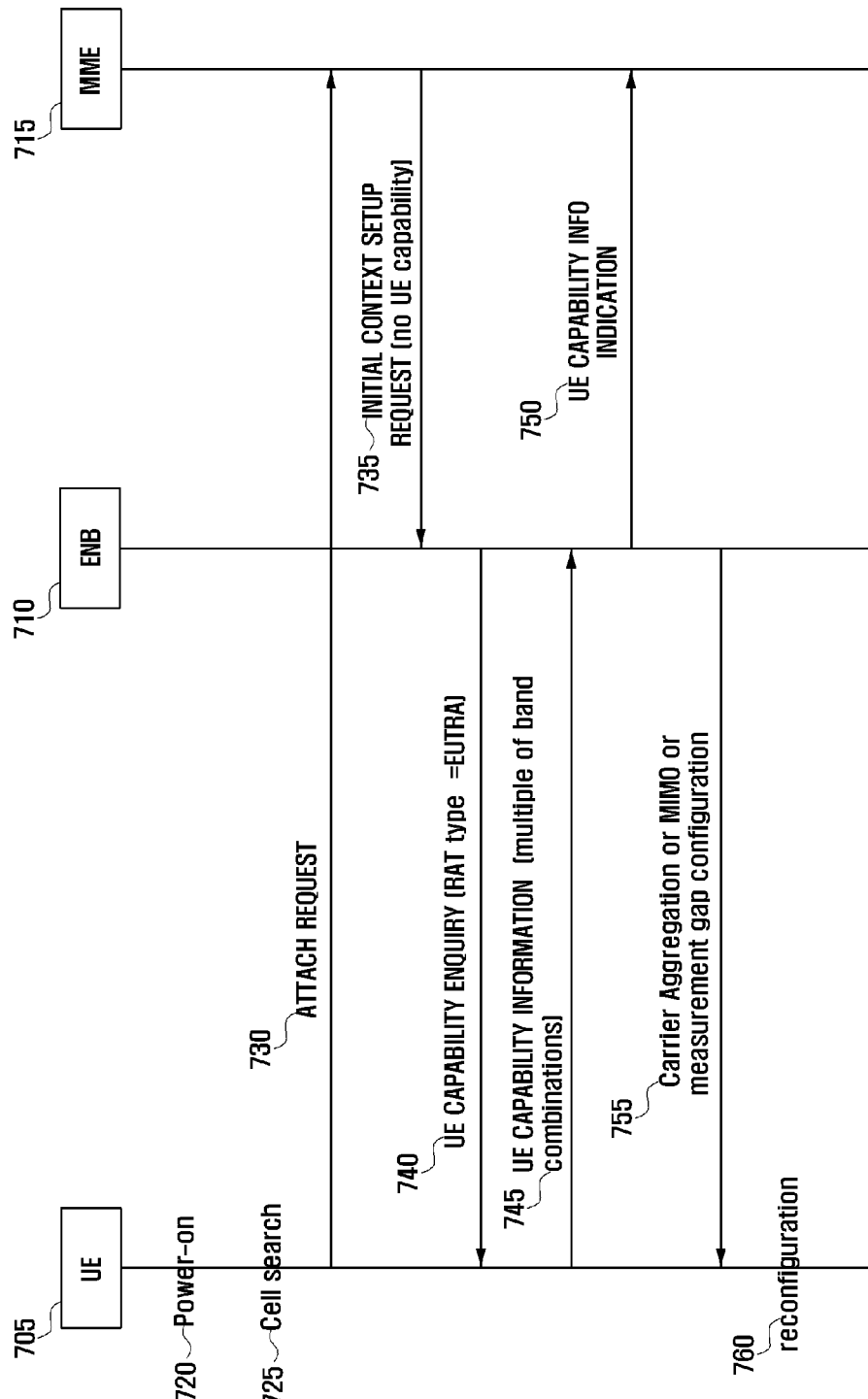
FIG. 7 is a signaling diagram illustrating a UE capability report method according to an exemplary embodiment of the present invention.

In summary, the capability-related information of a UE according to an exemplary embodiment of the present invention is configured as follows:
  The band combination information includes one or more band parameters.
  Each band parameter includes one or more unit capabilities.
  If each band parameter includes a plurality of unit capabilities, all of the unit capabilities included in one band parameter and the other band parameter can be freely combined with each other and all of the capability combinations have the same measurement gap requirement. That is, the UE determines the number of unit capabilities and the unit capabilities to be included in each band parameter in consideration of its supportable unit capability combination and respective measurement gap requirements.
  As a result, multiple band combination information can be signaled for the same frequency band combination.
  For reference, the unit capabilities are marked with indications of downlink and uplink in the same band parameter. Only when all of the combinations among the downlink and uplink unit capabilities are supported, the UE can package the unit capabilities in the same band combination.
  If two unit capability combinations have the same measurement gap requirement, this means that the measurement gap requirement information of the two capability combinations are identical with each other. The measurement gap requirement information of a certain capability combination is 1-bit information indicating whether a measurement gap is required for measuring on the frequency bands supported by the UE when the UE operates with a unit capability combination (i.e., when the UE operates with a number of cells and bandwidth and layers of the cells represented by the unit capability combination in the band combination).
  FIG. 7 is a signaling diagram illustrating a UE capability report method according to an exemplary embodiment of the present invention.
  Referring to FIG. 7, in the mobile communication system including a UE 705, an eNB 710, and an MME 715, the UE 705 powers on in step 720. Next, the UE 705 performs a cell search process to discover cells transmitting signals and Public Land Mobile Networks (PLMNs) and determines a cell and PLMN with which to proceed the authentication process based on a result of the cell search in step 725. The UE 705 performs a Radio Resource Control (RRC) connection setup process through the selected cell and then transmits a control message requesting for registration (i.e., an ATTACH REQUEST) to the MME 715 in step 730. The ATTACH REQUEST message includes UE information such as a UE identifier.
  Upon receipt of the ATTACH REQUEST message, the MME 715 determines whether to permit registration of the UE 705 and, if the MME 715 determines to permit registration of the UE 705, transmits a control message (i.e., an INITIAL CONTEXT SETUP REQUEST) to the serving eNB 715 of the UE 705 in step 735. If the MME 715 has the capability information of the UE 705, the UE capability information is transmitted to the eNB 710 in the INITIAL CONTEXT SETUP REQUEST message. Here, since the MME 715 has no UE information during the initial registration process, the INITIAL CONTEXT SETUP REQUEST message carries no UE capability information.
  If the INITIAL CONTEXT SETUP REQUEST message having no UE capability information is received, the eNB 710 transmits a control message, i.e., a UE CAPABILITY ENQUIRY message to the UE 705 in step 740. The UE CAPABILITY ENQUIRY message is the message requesting the UE 705 to report UE capability information using a parameter referred to as a Radio Access Technology (RAT) Type with which the RAT supported by the UE 705 is enquired. If the UE is performing this process in an LTE network, the RAT Type is set to Evolved Universal Terrestrial Radio Access (EUTRA). The eNB 710 also can request the UE for UMTS-related capability information by adding Universal Terrestrial Radio Access (UTRA) in the RAT Type for preparing for a subsequent handover to a UMTS network.

Upon receipt of the UE CAPABILITY ENQUIRY message, the UE 705 generates a control message, i.e., a UE CAPABILITY INFORMATION, including UE capability information indicated by the RAT Type. The UE CAPABILITY INFORMATION message includes one or more band combination information of each band combination supported by the UE 705. The band combination information includes one or more unit capabilities, and the UE 705 packages one or more unit capabilities into a band combination information such that the UE supports all of the combinations among the included unit capabilities with the same measurement gap requirement. As a result, a plurality of band combination information can be included for the same band combination.

The UE 705 transmits the UE CAPABILITY INFORMATION message to the eNB in step 745. The eNB 710 transmits a UE CAPABILITY INFO INDICATION message to the MME 715 to report the capability information of the UE 705 that is included in the UE CAPABILITY INFORMATION message in step 750. The eNB 710 reconfigures the UE 705 based on the capability information in consideration of the traffic status and channel status of the UE in step 755. For example, the eNB 710 instructs the UE 705 to reconfigure additional carriers, MIMO, and/or measurement gap. Finally, the UE 705 performs reconfiguration according to the configuration command from the eNB 710 in step 760 and then performs normal communication.

Figure 8:
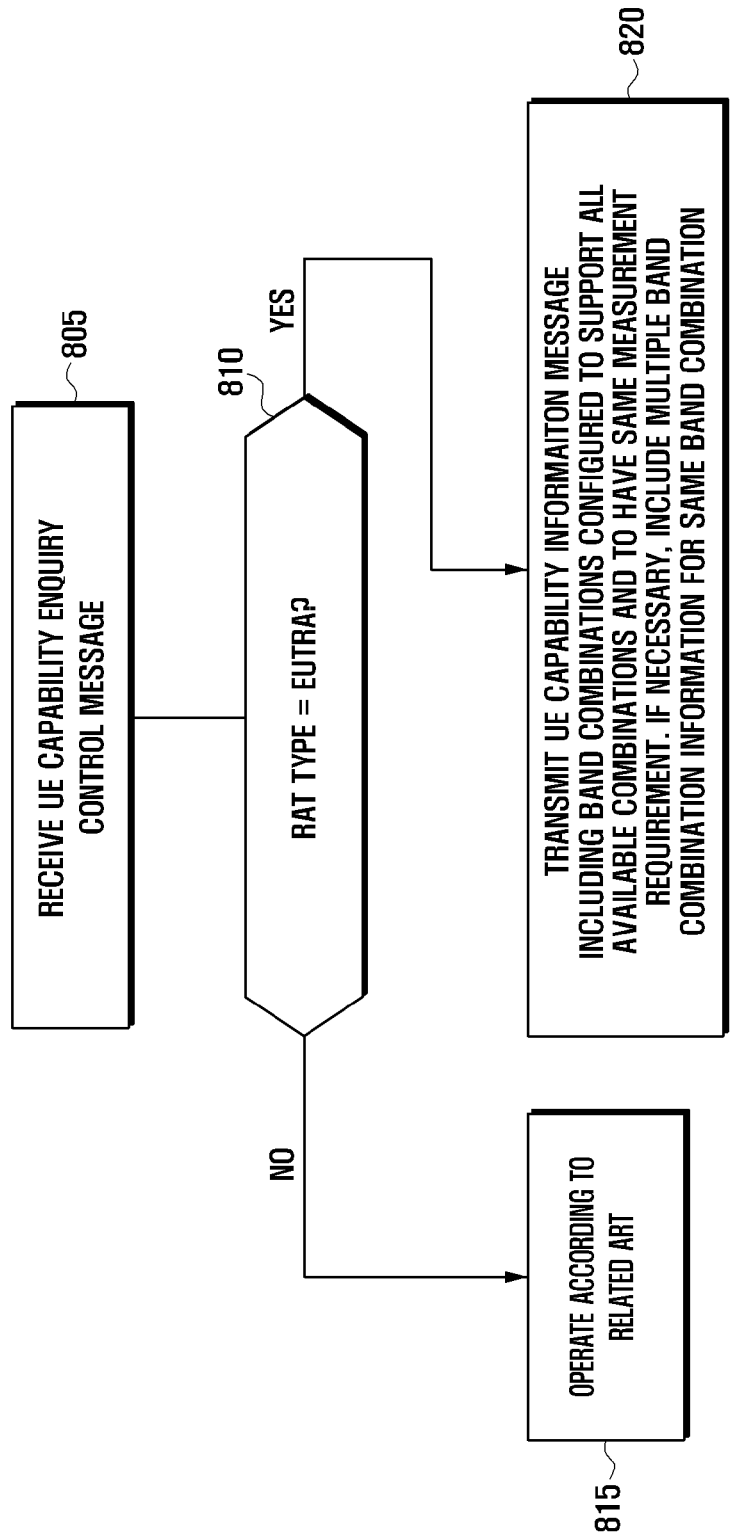
FIG. 8 is a flowchart illustrating a UE procedure of a capability report method according to an exemplary embodiment of the present invention.

FIG. 8 is a flowchart illustrating a UE procedure of a capability report method according to an exemplary embodiment of the present invention.

Referring to FIG. 8, if a UE CAPABILITY ENQUIRY control message is received in step 805, the UE checks the RAT Type in the UE CAPABILITY ENQUIRY control message in step 810. If the RAT Type is set to EUTRA, the procedure goes to step 820 and, otherwise, goes to step 815. At step 815, the UE operates according to operations of the related art. At step 820, the UE transmits its LTE capability information in a UE CAPABILITY INFORMATION control message. The LTE capability information includes one or more band combination information on the band combinations supported by the UE. The band combination information includes one or more unit capabilities fulfilling one or more of the following conditions:
  All of the combinations among the unit capabilities are supported by the UE.
  All of the combinations among the unit capabilities have the same measurement gap.

Figure 9:
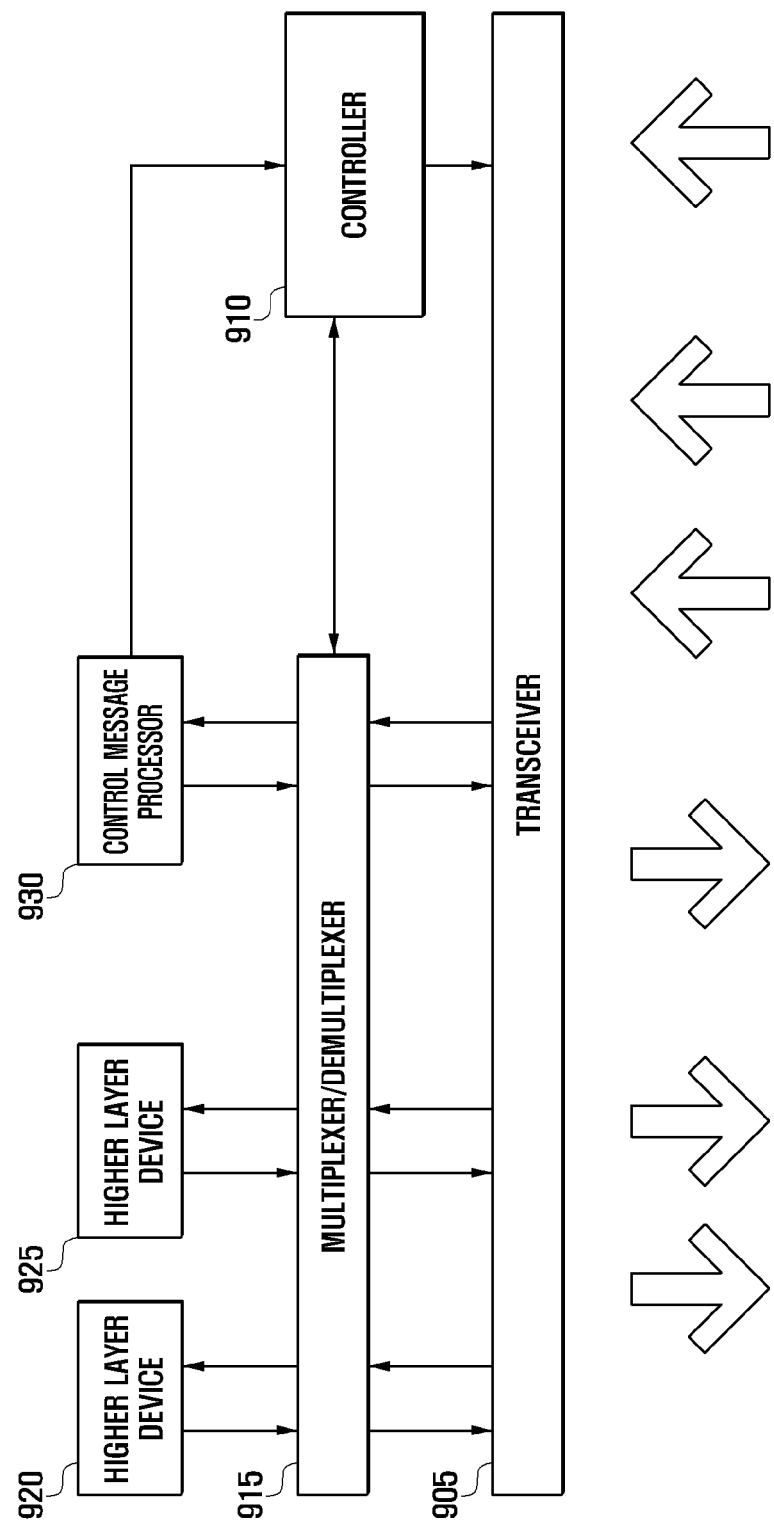
FIG. 9 is a block diagram illustrating a configuration of a UE according to an exemplary embodiment of the present invention.

FIG. 9 is a block diagram illustrating a configuration of a UE according to an exemplary embodiment of the present invention.

Referring to FIG. 9, the UE according to an exemplary embodiment of the present invention includes a transceiver 905, a controller 910, a multiplexer/demultiplexer 915, a control message processor 930, and higher layer devices 920 and 925.

The transceiver 905 receives data and control signals on the downlink carriers and transmits data and control signals on the uplink carriers. In a case where a plurality of cells is configured, the transceiver 805 can transmit/receive the data and control signals through the multiple cells. Here, the transceiver 905 receives the control message requesting a capability report.

The multiplexer/demultiplexer 910 multiplexes the data from the higher layer devices 920 and 925 and/or control message processor 930 and demultiplexes the data received by the transceiver 905 and transfers the demultiplexed data to the higher layer devices 920 and 925 and/or the control message processor 930.

The control message processor 930 takes an action for processing the control message received from the eNB. If a control message such as a UE CAPABILITY ENQUIRY message is received, the control message processor 930 analyzes the content of the control message to take an appropriate action, e.g., generates a UE CAPABILITY INFORMATION control message including UE capability information and sends the UE CAPABILITY INFORMATION control message to a lower layer.

The higher layer devices 920 and 925 can be implemented for respective services so as to deliver the data generated by the user service such as File Transfer Protocol (FTP) and VoIP to the multiplexer/demultiplexer 915 or process and deliver the data from the multiplexer/demultiplexer 915 to service applications of a higher layer.

The controller 910 checks the scheduling command, e.g., uplink grant, received by the transceiver 905 and controls the transceiver 905 and multiplexer/demultiplexer 915 to perform uplink transmission at an appropriate time on an appropriate transmission resource. Here, the controller 910 determines whether the RAT Type is set to EUTRA. If the RAT Type is set to EUTRA, the controller 910 controls the transceiver 905 to transmit at least one band combination information on the band combinations supported by the UE.

A description is made of the number of layers that is signaled as sub information of the band parameter in more detail. MIMO operation can be summarized as the operation for a UE to transmit/receive multiple data streams on the same transmission resource using multiple antennas. Here, the stream transmitted/received per layer is referred to as layer. The number of layers defined in view of unit capability is the information indicating how many data streams can be transmitted/received (or how many antennas can be used) in the corresponding unit capability.

Particularly in downlink, the antenna separation is one of the important factors determining performance when the UE receives data through multiple antennas (multiple layers). In case of operating on a certain frequency carrier, the antenna separation shorter than half the wavelength causes interference, resulting in significant performance degradation. Accordingly, although the UE is provided with n antennas, the number of layers may be less than n depending on the frequency band. The most efficient number of layers per frequency band may vary depending on the number of antennas of the UE, when combined frequency bands are different from or identical with each other, wave length of the corresponding frequency band, and required antenna separation of the corresponding band.

When reporting the number of layers to the network, it is also considered that the eNB may not interpret the band combination information. This is the case when the eNB is restricted in performance due to low capability and old technology version. Accordingly, it is preferred to provide two types of informations: one that can be interpreted by all the eNBs and the other that can be interpreted some eNBs.

By taking notice of the above facts, the number of layers is reported as follows:
  The information indicating number of layers is divided into first information and second information.
  The first information is the information interpretable by all the eNBs and has the following properties:
    The first information has a value for every band combination. That is, the first information is provided with a value per UE. The UE reports a number of layers in the first information, and the eNB having no capability to interpret the second information determines the number of layers for all of the bands as indicated in the first information and determines UE's MIMO configuration accordingly.

The first information is determined depending on the number of UE's antennas and type of the frequency band supported by the UE. In more detail, the first has a value equal to or less than the number of UE's antennas. When selecting the first information, the UE takes the number of layers maximizing performance into consideration with all the frequency bands supported by the UE. For example, the UE supports 700 MHz and 2.5 GHz and has four antennas. Suppose that the antenna separation is 6 cm when using all of the four antennas and 18 cm when using two antennas. In order to guarantee an appropriate performance, the antenna separation is 20 cm as half the wavelength at 700 MHz and 6 cm at 2.5 GHz. Accordingly, the number of layers for operation efficiency is 1 at 700 MHz and 4 at 2.5 GHz. At this time, the UE can select one appropriate between two or another value showing appropriate performance for both the cases as the first information. In the above example, although there is a little performance degradation with two layers as compared to one layer at 700 MHz, it is possible to select the case of 2 layers as the first information if the performance improvement is greater than the performance degradation at 2.5 GHz.

The first information can be provided in the form of an index combined with another information. For example, the first information can be combined with the UE category information specifying the UEs' baseband processing capability and soft buffer capability. For example, assuming that category x means the combination of x1 Mbps processing capability, x2 bit soft buffer, and x3 layer, and category y means the combination of y1 Mbps processing capability, y2 bit soft buffer, and y3 layer; the UE selects its category that can express the capability information well in consideration of the processing performance, soft buffer size, and the first information. For example, the UE has z1 (y1>z1>x1) Mbps processing performance, z2 (y2>z2>x2) soft buffer, and z3 (y3>z3>z3) layers as the first information, the UE selects and reports the category x which expresses its category most similarly without exceeding its processing performance, soft buffer size, and number of first layers.

The second information is the information interpretable by advanced eNB and has the following properties.

The second information has a value per band. The UE selects the number of layers that can support the MIMO operation on the corresponding band combination most efficiently per band in the band combination information as the second information.

The second information on a certain band is determined in association with the information on whether the band includes a part of which unit performance for which band combination and a number of antennas that can providing antenna separation equal to or longer than half the wavelength of the corresponding band (i.e. number of antennas in antenna configuration providing the antenna separation required for the corresponding band).

In case that the UE support 700 MHz and 2.5 GHz and has four antennas, the antenna separation required at 700 MHz is 20 cm and the antenna separation required at 2.5 GHz is 6 cm. Assuming, in UE form factor, that the maximum antenna separation is 21 cm for use of two antennas and 7 cm for use of four antennas, the UE selects 1 layer as the second information for 700 MHz band and 4 layers as the second information for 2.5 GHz band.

Accordingly, the first information and the second information may differ from each other. Particularly at a high frequency band, the second information may be higher than the first information and, at a low frequency band, the second information may be lower than the first information.

Figure 10:
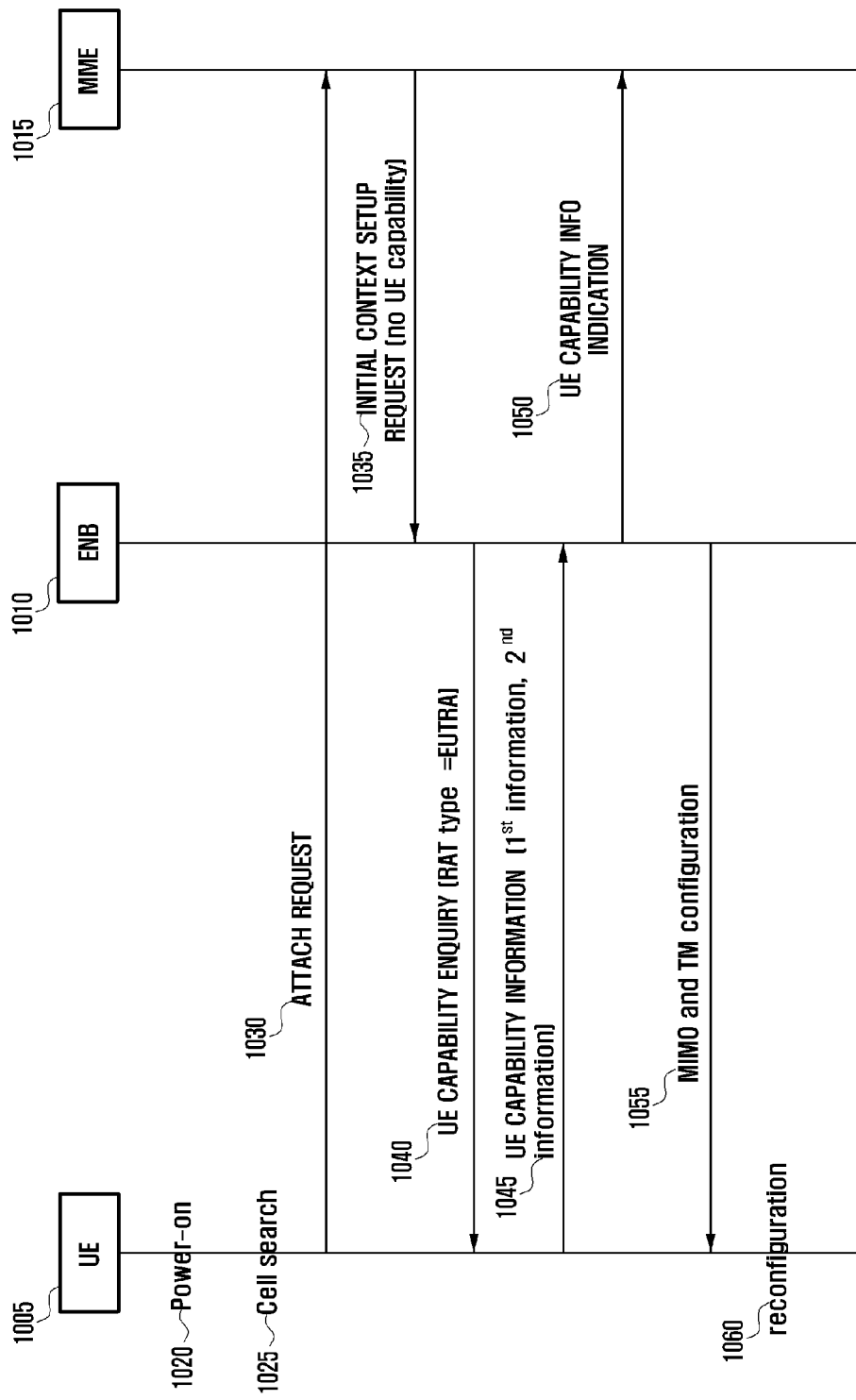
FIG. 10 is a signaling diagram illustrating message flows between UE and eNB for configuring number of layer report and MIMO configuration according to an exemplary embodiment of the present invention.

FIG. 10 is a signaling diagram illustrating message flows between UE and eNB for configuring number of layer report and MIMO configuration according to an exemplary embodiment of the present invention.

Referring to FIG. 10, in the mobile communication system including a UE 1005, an eNB 1010, and an MME 1015, the UE 1005 powers on in step 1020. Next, the UE 1005 performs a cell search process to discover cells transmitting signals and PLMNs and determines a cell and PLMN with which to proceed the authentication process based on a result of the cell search in step 1025.

The UE 1005 performs a RRC connection setup process through the selected cell and then transmits a control message requesting for registration (i.e., an ATTACH REQUEST) to the MME 1015 in step 1030. The ATTACH REQUEST message includes UE information such as a UE identifier.

Upon receipt of the ATTACH REQUEST message, the MME 1015 determines whether to permit registration of the UE 1005. If it is determined to permit registration of the UE 1005, the MME 1015 transmits a control message (i.e., an Initial Context Setup Request) to the serving eNB 1015 of the UE 1005 in step 1035. If the MME 1015 has the capability information of the UE 1005, the UE capability information is transmitted to the eNB 1010 in the Initial Context Setup Request message. Here, since the MME 1015 has no UE information during the initial registration process, the Initial Context Setup Request message carries no UE capability information.

If the Initial Context Setup Request message having no UE capability information is received, the eNB 1010 transmits a control message, i.e., a UE CAPABILITY ENQUIRY message to the UE 1005 in step 1040. The UE CAPABILITY ENQUIRY message is the message requesting the UE 1005 to report UE capability information using a parameter referred to as a RAT Type with which the RAT supported by the UE 1005 is enquired. If the UE is performing this process in an LTE network, the RAT Type is set to EUTRA. The eNB 1010 also can request the UE for UMTS-related capability information by adding UTRA in the RAT Type for preparing for a subsequent handover to a UMTS network.

Upon receipt of the UE CAPABILITY ENQUIRY message, the UE 1005 generates a UE CAPABILITY INFORMATION message including UE capability information indicated by the RAT Type. The UE CAPABILITY INFORMATION message includes one first information and multiple second informations. The second informations are included for respective bands. As aforementioned, the UE 1005 determines the number of layers to be reported in the first information and the number of layers to be reported in the second informations and inserts the first and second informations reflecting the number of layers in appropriate fields of the control message.

The UE 1005 transmits the UE CAPABILITY INFORMATION message to the eNB 1010 in step 1045. The eNB 1010 transmits a UE CAPABILITY INFOR INDICATION message to the MME 1015 to report the UE capability information included in the UE CAPABILITY INFORMATION message to the MME 1015 in step 1050.

The eNB 1010 reconfigures the UE 1005 by referencing the UE's traffic status and channel condition based on the capability information reported by the UE 1005. At this time, if the UE can understand only the first information, the eNB 1010 determines the MIMO configuration in consideration of the number of layers indicated in the first information and transmits the determination result to the UE 1005. The information defining the MIMO configuration includes the number of layers and transmission mode (TM). The transmission mode is the information combining the UE's feedback scheme, whether to use transmit diversion, and antenna port and specified in 3GPP TS 36.213.

The UE performs reconfiguration as commanded by the eNB 1010 and performs normal communication process in step 1060.

FIG. 11 is a flowchart illustrating operating procedure of the UE according to another exemplary embodiment of the present invention.

Referring to FIG. 11, if the UE CAPABILITY ENQUIRY control message is received at step 1105, the UE checks RAT Type in step 1110. If the RAT Type is set to EUTRA, the procedure goes to step 1120 and, otherwise if the RAT Type is set to a value other than EUTRA, step 1115. At step 1115, the UE operates according to the related art. The UE transmits the UE CAPABILITY INFORMATION control message including its LTE capability information in step 1120. The LTE capability information includes one or more band combination informations on the band combinations supported by the UE. The band combination information includes one or more unit capabilities that can be included in a band combination only when the unit capabilities fulfill the following conditions:

All combinations of unit capabilities are supported by the UE; and

All combinations of unit capabilities have the same measurement gap requirement.

The unit capability of the band combination information includes the second information (or number of second layers) which is determined as the greatest value fulfilling the antenna separation required on the corresponding frequency band.

The UE CAPABILITY INFORMATION control message also includes the UE category information reflecting the first information (or number of first layers).

As described above, the UE capability report method of exemplary embodiments of the present invention is capable of efficiently reporting the UE capability related to advanced functions, such as carrier aggregation and MIMO, to the network with the least amount of information, thereby resulting in an improvement of radio resource efficiency.

While the invention has been shown and described with reference to certain exemplary embodiments thereof, it will be understood by those skilled in the art that various changes in form and details may be made therein without departing from the spirit and scope of the invention as defined by the appended claims and the equivalents.

What is claimed is:

1. A method for reporting capability of a User Equipment (UE), the method comprising:
generating a UE capability message comprising at least one band combination information; and
transmitting the generated UE capability message to an evolved Node B (eNB),
wherein each band combination information comprises at least one band parameter including a band indicator indicating a frequency band and first band capability information and second band capability information,
wherein the first capability information and the second capability information each include carrier aggregation (CA) information and information on a number of layers supported by the UE on the indicated frequency band, and
wherein the CA information includes a single value corresponding to a maximum number of component carriers and an aggregated transmission bandwidth configuration of the band both supported by the UE on the indicated frequency band.

2. The method of claim 1, wherein the aggregated transmission bandwidth configuration indicates a bandwidth size supported by the UE in the band.

3. The method of claim 1, wherein the number of layers indicates Multiple Input Multiple Output (MIMO) capability.

4. The method of claim 1, wherein all the combinations of the unit capability in each band combination information are supported by the UE.

5. The method of claim 1, wherein all the combinations of the unit capability in each band combination information have a same measurement gap requirement.

6. The method of claim 1, further comprising:
receiving a UE capability enquiry message from the eNB,
wherein the generating of the UE capability message is performed in response to receiving the UE capability enquiry message from the eNB.

7. The method of claim 1, further comprising:
setting a Radio Access Technology (RAT) type of the UE capability message to EUTRA, if an EUTRA indicator is included in a UE capability enquiry message.

8. An apparatus for reporting capability of a User Equipment (UE), the apparatus comprising:
a controller configured to control to generate a UE capability message comprising at least one band combination information; and
a transceiver configured to transmit the generated UE capability message to an evolved Node B (eNB),
wherein each band combination information comprises at least one band parameter including a band indicator indicating a frequency band and first band capability information and second band capability information,
wherein the first band capability information and the second band capability information each include carrier aggregation (CA) information and information on a number of layers supported by the UE on the indicated frequency band, and
wherein the CA information includes a single value corresponding to a maximum number of component carriers and an aggregated transmission bandwidth configuration of the band both supported by the UE on the indicated frequency band.

9. The apparatus of claim 8, wherein the aggregated transmission bandwidth configuration indicates a bandwidth size supported by the UE in the band.

10. The apparatus of claim 8, wherein the number of layers indicates Multiple Input Multiple Output (MIMO) capability.

11. The apparatus of claim 8, wherein all the combinations of the unit capability in each band combination information are supported by the UE.

12. The apparatus of claim 10, wherein all the combinations of the unit capability in each band combination information have a same measurement gap requirement.

13. The apparatus of claim 8, wherein the transceiver is further configured to receive a UE capability enquiry message from the eNB, and
the controller is further configured to generate the UE capability message in response to receiving the UE capability enquiry message from the eNB.

14. The apparatus of claim 8, the controller is further configured to set a Radio Access Technology (RAT) type of the UE capability message to EUTRA, if an EUTRA indicator is included in a UE capability enquiry message.

15. A method by an evolved Node B (eNB) for receiving capability of a User Equipment (UE), the method comprising:
transmitting a UE capability enquiry message to the UE; and
receiving a UE capability message from the UE,
wherein the UE capability message comprises at least one band combination information and each band combination information comprises at least one band parameter including a band indicator indicating a frequency band and first band capability information and second band capability information,
wherein the first band capability information and the second band capability information each include carrier aggregation (CA) information and information on a number of layers supported by the UE on the indicated frequency band, and
wherein the CA information includes a single value corresponding to a maximum number of component carriers and an aggregated transmission bandwidth configuration of the band both supported by the UE on the indicated frequency band.

16. The method of claim 15, wherein the aggregated transmission bandwidth configuration indicates a bandwidth size supported by the UE in the band.

17. The method of claim 15, wherein the number of layers indicates Multiple Input Multiple Output (MIMO) capability.

18. The method of claim 15, wherein all the combinations of the unit capability in each band combination information are supported by the UE.

19. The method of claim 15, wherein all the combinations of the unit capability in each band combination information have a same measurement gap requirement.

20. The method of claim 15, wherein the receiving of the UE capability message is performed in response to transmitting the UE capability enquiry message to the UE.

21. The method of claim 15, wherein if an EUTRA indicator is included in the UE capability enquiry message, a Radio Access Technology (RAT) type of the UE capability message is set to EUTRA.

22. An apparatus of an evolved Node B (eNB) for receiving capability of a User Equipment (UE), the apparatus comprising:
a transceiver; and
a controller configured to control the transceiver to:
transmit a UE capability enquiry message to the UE, and
receive a UE capability message from the UE,
wherein the UE capability message comprising at least one band combination information and each band combination information comprises at least one band parameter including a band indicator indicating a frequency band and first band capability information and second band capability information,
wherein the first band capability information and the second band capability information each include carrier aggregation (CA) information and information on a number of layers supported by the UE on the indicated frequency band, and
wherein the CA information includes a single value corresponding to a maximum number of component carriers and an aggregated transmission bandwidth configuration of the band both supported by the UE on the indicated frequency band.

23. The apparatus of claim 22, wherein the aggregated transmission bandwidth configuration indicates a bandwidth size supported by the UE in the band.

24. The apparatus of claim 22, wherein the number of layers indicates Multiple Input Multiple Output (MIMO) capability.

25. The apparatus of claim 22, wherein all the combinations of the unit capability in each band combination information are supported by the UE.

26. The apparatus of claim 22, wherein all the combinations of the unit capability in each band combination information have a same measurement gap requirement.

27. The apparatus of claim 22, wherein the controller is further configured to receive the UE capability message in response to transmitting the UE capability enquiry message to the UE.

28. The apparatus of claim 22, wherein if an EUTRA indicator is included in the UE capability enquiry message, a Radio Access Technology (RAT) type of the UE capability message is set to EUTRA.

* * * * *